(No Model.)

J. H. ALLEN.
CULTIVATOR.

No. 271,586. Patented Feb. 6, 1883.

Witnesses:
R. A. Becher
A. M. Moulton

Inventor:
James H. Allen

UNITED STATES PATENT OFFICE.

JAMES H. ALLEN, OF WENONA, ILLINOIS.

CULTIVATOR.

SPECIFICATION forming part of Letters Patent No. 271,586, dated February 6, 1883.

Application filed July 20, 1882. (No model.)

To all whom it may concern:

Be it known that I, JAMES H. ALLEN, a citizen of the United States, residing at Wenona, in the county of Marshall and State of Illinois, have invented a certain new and useful Improvement in Wheel-Cultivators; and I do hereby declare that the following is a full, clear, and exact description of the invention.

My invention relates to improvements in wheel-cultivators, in which a cultivator for each side of a row of corn or other grain is attached to the running-gears of any two-wheeled cultivator.

The objects of my improvement are, first, to thoroughly pulverize the ground and kill the weeds without injuring the growing corn or other grain; second, to provide an adjustable frame-work that may be attached to the running-gears of any two-wheeled cultivator; third, to provide an adjustment of the shank to which the shovels are attached with the frame-work, so that the shovels may be readily lowered and raised. I attain these objects by the mechanism illustrated in the accompanying drawings, in which—

Figure 1:
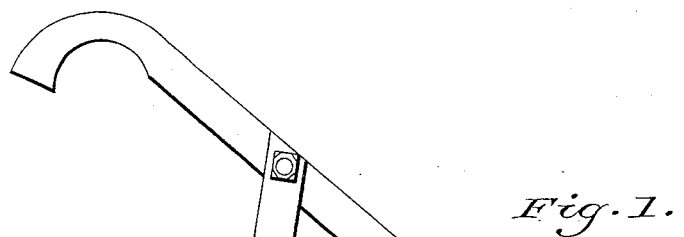
Figure 2:
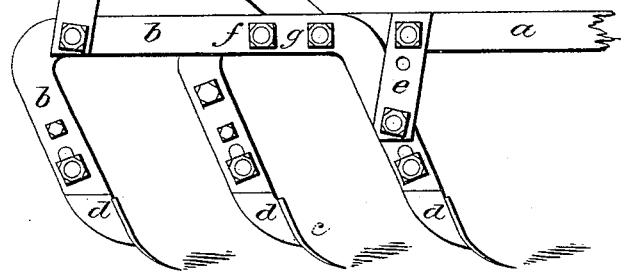
Figure 3:
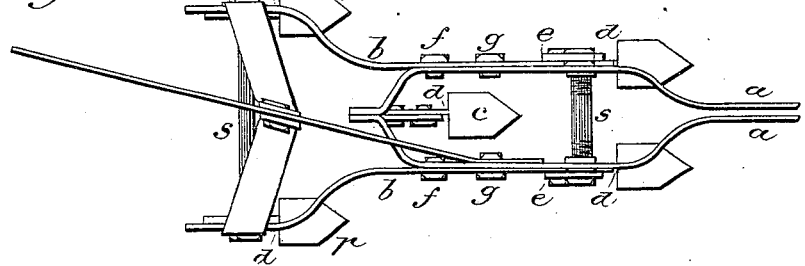
Figure 4:
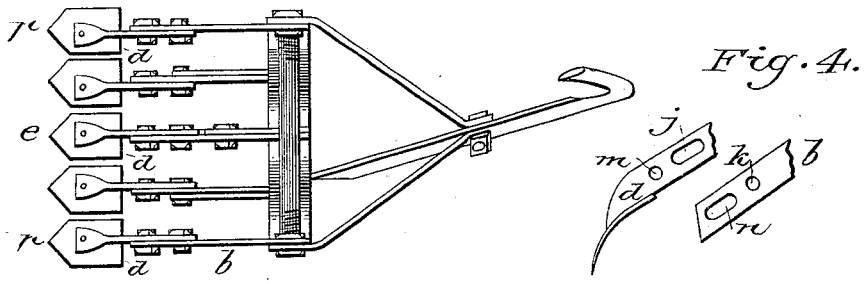

Figure 1 is a side view, Fig. 2 is a top or plan view, Fig. 3 is a rear view, and Fig. 4 a detail view, of one gang of a straddle-row cultivator.

Similar letters refer to similar parts throughout the several views.

The beams $a\ a$ extend back and attach to the shank $d$ of the middle shovel, $c$, and the side pieces, $b\ b$, extend on each side and attach to the shanks of the front and hind shovels, and constitute the frame-work.

The frame-work is all made of iron. Each side piece, $b\ b$, extending from shank $d$ of the front shovels to shank $d$ of the hind shovels, is one piece.

The beam $a\ a$, extending to shank $d$ of shovel $c$, is composed of two pieces—one attached to either side of the frame-work, of which this is a part. Five small shovels, about three by six inches in size, are attached to this frame-work by shanks $d$. These shovels, as shown in Figs. 2 and 3, are so arranged that the middle shovel, $c$, and the two hind shovels, $p\ p$, plow the middle and outside ridges made by the two front shovels, all together thoroughly pulverizing and cleaning the ground passed over. By removing the bolts $f f$ and braces $e\ e$ the frame-work of the beam $a\ a$ is left free to work on the hinge G G, allowing the beam $a\ a$ to be raised or lowered, so that it may be attached to running-gears of wheel-cultivators of different heights.

The shanks $d$, to which the shovels are attached, are fastened to the frame-work as follows, (see Fig. 4:) A bolt passes through the hole $k$ in frame-piece $b$ and slot J in shank $d$. Another bolt passes through the hole $m$ in shank $d$ and slot $n$ in frame-piece $b$, thus making a strong adjustable coupling, and by means of which the shovels may be raised or lowered by loosening and tightening the nuts of the two bolts.

Two of these cultivators are to be attached to the running-gears of any wheel-cultivator.

Having fully described my invention, what I desire to claim by Letters Patent is—

1. In a wheel-cultivator, the shovel-frame composed of the curved bars $a\ a$, forming the center shovel-standard, the side bars, $b\ b$, each bent to form shovel-standards at the front and rear ends, and the bolts $f\ g$, substantially as shown and described.

2. The combination of the bars $a\ a$ with the side bars, $b\ b$, each carrying shovels, as shown and described, the bolts $g$, and the cross-bars $s$, whereby a jointed or flexible frame is formed, capable of being coupled to axles of different heights, substantially as shown and described.

JAMES H. ALLEN.

Witnesses:
 R. F. BECHER,
 S. V. ROBBINS.